US007436429B2

(12) United States Patent
Tillotson

(10) Patent No.: US 7,436,429 B2
(45) Date of Patent: Oct. 14, 2008

(54) VIRTUAL PAN/TILT CAMERA SYSTEM AND METHOD FOR VEHICLES

(75) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 860 days.

(21) Appl. No.: 10/722,148

(22) Filed: Nov. 24, 2003

(65) Prior Publication Data

US 2005/0110869 A1    May 26, 2005

(51) Int. Cl.
    *H04N 7/18* (2006.01)
(52) U.S. Cl. .................. 348/36; 348/39; 348/113; 348/114
(58) Field of Classification Search ............ 348/10–200
    See application file for complete search history.

(56) References Cited

U.S. PATENT DOCUMENTS

| | | | | |
|---|---|---|---|---|
| 4,100,571 | A * | 7/1978 | Dykes et al. | 348/37 |
| 4,310,849 | A | 1/1982 | Glass | |
| 4,518,990 | A * | 5/1985 | Gilvydis | 348/39 |
| 4,672,435 | A * | 6/1987 | Gluck | 348/44 |
| 4,772,942 | A * | 9/1988 | Tuck | 348/38 |
| 5,200,818 | A * | 4/1993 | Neta et al. | 348/39 |
| 5,495,576 | A * | 2/1996 | Ritchey | 345/420 |
| 5,563,650 | A * | 10/1996 | Poelstra | 348/36 |
| 5,677,728 | A | 10/1997 | Schoolmn | |
| 5,745,166 | A | 4/1998 | Rhodes et al. | |
| 5,850,352 | A * | 12/1998 | Moezzi et al. | 345/419 |
| 6,002,430 | A * | 12/1999 | McCall et al. | 348/207.99 |
| 6,166,763 | A | 12/2000 | Rhodes et al. | |
| 6,335,754 | B1 * | 1/2002 | Endo et al. | 348/37 |
| 6,479,813 | B2 | 11/2002 | Takada et al. | |

2002/0180759 A1   12/2002   Park et al.

FOREIGN PATENT DOCUMENTS

JP   09260167   4/1999

(Continued)

OTHER PUBLICATIONS

"*Stereoscopic Video Cameras*", web site provided by Stereomedia 3D Video Productions, printed Apr. 10, 2003, four pages.

(Continued)

*Primary Examiner*—Ahand Rao
(74) *Attorney, Agent, or Firm*—Harness, Dickey & Pierce, P.L.C.

(57) ABSTRACT

The present disclosure is directed to a virtual pan/tilt camera system and method for use with vehicles, and particularly ground vehicles (MGVs). The disclosure utilizes autonomous navigation systems (ANSs) used with pan/tilt cameras, but eliminates the pan/tilt cameras substituting a plurality of video cameras. Each video camera is mounted in a fixed orientation on the vehicle and covers a selected angular range of lateral view. Commands from the ANS are mapped to selected addresses where the video data from the video cameras are stored, and appropriately transformed data from the selected addresses are input to the ANS. Computers and software in the MGV receive video data from the cameras and stitch the imagery together into a single panoramic view. Video data from cameras with overlapping fields of view are used to simulate the view of stereo cameras.

34 Claims, 4 Drawing Sheets

FOREIGN PATENT DOCUMENTS

| | | |
|---|---|---|
| JP | 11094191 A2 | 4/1999 |
| JP | 2000321628 A2 | 11/2000 |
| JP | 2000356797 A2 | 12/2000 |
| JP | 11223689 | 2/2001 |
| JP | 2000340190 | 5/2002 |

OTHER PUBLICATIONS

"*3D Stereoscopic Video Display Systems Laboratory*", web site provided by The Robotics Institute and Carnegie Mellon University, last update May 15, 1998, printed Apr. 10, 2003, six pages.

"*Our AVDS & Sensor Lab Publications*", web site provided by The Robotics Institute and Carnegie Mellon University, last update May 15, 1998, printed Apr. 10, 2003, twelve pages.

"*Stereoscopic Video and Augmented Reality*", web site provided by David Drascic, printed Apr. 9, 2003, five pages.

"*Stereoscopic Video Equipment*", available from Curtin University's Centre for Marine Science and Technology, printed Apr. 10, 2003, three pages.

"*Centre for Marine Science & Technology SVD20A Flicker-Free Stereoscopic Video Display System*", Curtin University of Technology Western Australia, last updated Jun. 28, 2001, printed Apr. 10, 2003, two pages.

"*Compression of Stereoscopic Video by Using MPEG-2 Main Profile*" by Do-Nyeon Kim and Myoung Ho Lee, Electronics and Telecommunications Research Institute, no date, pp. 117-121.

"*Preliminary Experience With a Stereoscopic Video System in a Remotely Piloted Aircraft Application*", By Terrence W. Rezek, NASA Ames Research Center, Sep. 1983, pp. 1-11.

\* cited by examiner

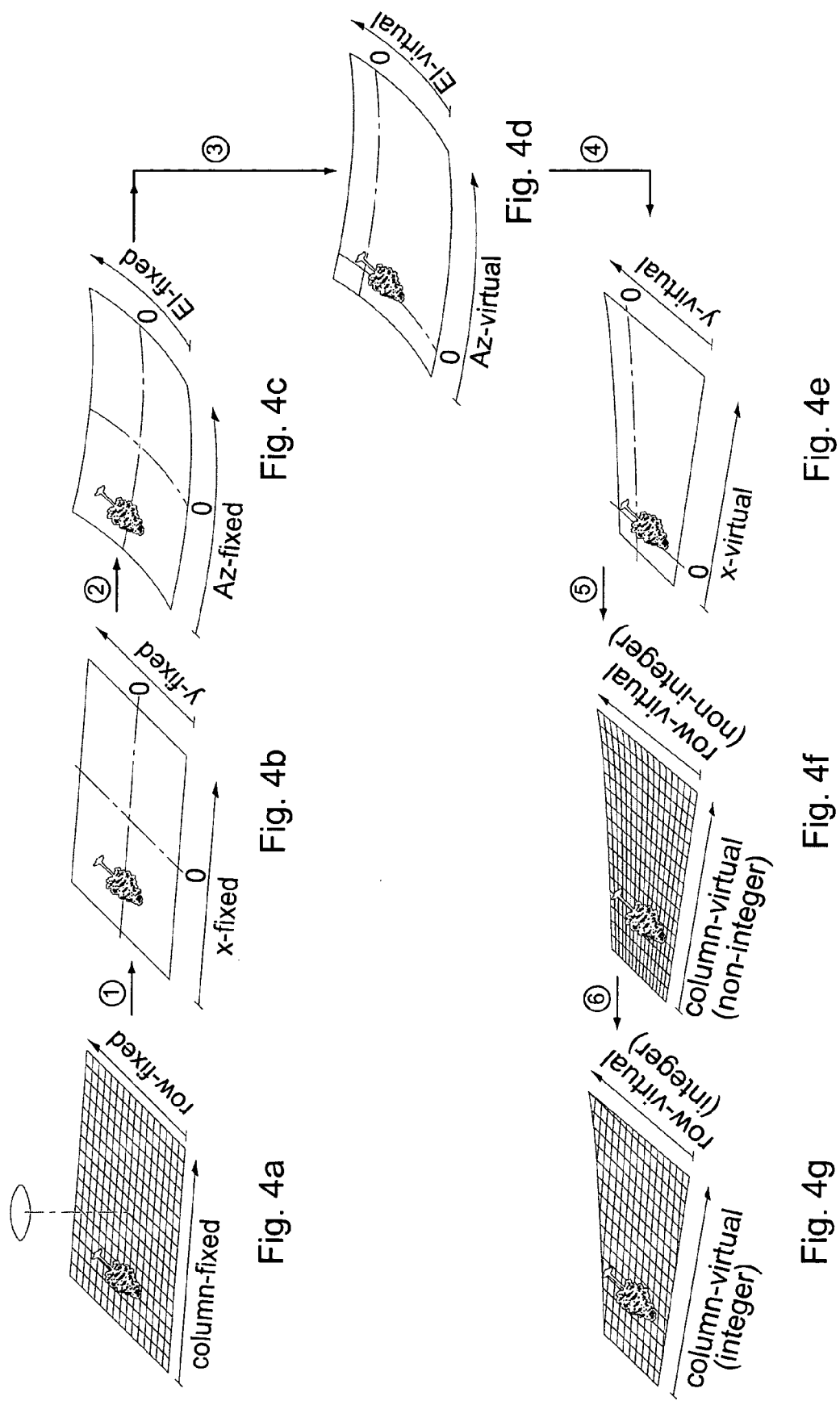

VIRTUAL PAN/TILT CAMERA SYSTEM AND METHOD FOR VEHICLES

STATEMENT REGARDING FEDERALLY SPONSORED RESEARCH OR DEVELOPMENT

The subject matter of the present disclosure was developed in the course of work under U.S. government contract MDA972-02-9-0005. The U.S. government may possess certain rights in the subject matter of the present disclosure.

BACKGROUND

The present disclosure is directed to a camera system for vehicles for use with autonomous navigation systems (ANSs), and more particularly to a virtual pan/tilt camera system and method for use with ANSs for ground vehicles, more specifically manned ground combat vehicles.

Unmanned ground vehicles (UGVs) are valuable to the military involved in ground combat. The value of a UGV is increased when it is able to navigate autonomously as it reduces manpower that must be deployed for a given military operation. Modern ANSs for ground vehicles use machine vision to detect obstacles and navigate paths around the obstacles. Current ANSs use pan/tilt stereo cameras on the outside of the UGV so that the ANS computer can get a good view of the obstacles at close range.

ANSs used in modern unmanned ground vehicles operate using as sources of information: (1) a digital map of the terrain where the vehicle is operating that is precise to approximately a meter or better, and (2) redefined information that it deduces from the pan/tilt cameras used in the system. It also uses GPS coordinates to establish the vehicle's location. However, before the ANS directs the vehicle to begin moving, it may require a closer view of the area immediately surrounding the vehicle.

The ANS used with the present disclosure performs stereo imaging processing and autonomously navigates the ground vehicle in the same way it performs these functions when used in a pan/tilt camera system. The ANS, when used with pan/tilt cameras, receives two video data streams from a pair of pan/tilt cameras for the ANS to use to control the cameras by performing stereo image analyses. In accordance with the present disclosure, the same ANS receives two video data streams that "appear to" come from two pan/tilt cameras, when in fact they are video data streams that have been reformatted from fixed cameras.

While the present disclosure has been described by reference to specific embodiments and specific uses, it should be understood that other configurations and arrangements could be constructed, and different uses could be made, without departing from the scope of the disclosure as set forth in the following claims.

The autonomous navigation of ground vehicles is particularly difficult. To autonomously navigate over ground, detailed knowledge is required of objects down to a size that the vehicle can traverse. Therefore, ground navigation requires continuous detailed inspection of the area immediately ahead of the vehicle. For example, there may be obstacles such as trees, brush, rubble, boulders, and other objects that do not appear on the digital map. From a distance, the ANS can identify that a particular object is present, but may not be able to tell whether it is surmountable, i.e., whether the vehicle can travel over the object. To further identify and characterize such objects, the ANS causes the vehicle to navigate closer to the objects, and as it does so initiates suitable commands to the pan/tilt cameras to aim the cameras at the various nearby objects to gain better imagery of the objects. Objects that are classified as "impassable" are added to a dynamic map. The ANS selects an appropriate route, if such a route is available, and initiates commands to direct the vehicle between or around the impassable objects, and through or over the passable ones.

Pan/tilt cameras work well for an ANS and do not pose any excessive demands for most UGVs. To enable MGVs to travel while a crew is resting or disabled, and to enable the vehicles to operate unmanned when facing extreme danger, it is required that the MGV be able to operate the vehicle by remote control and navigate autonomously, such that the MGV must include an ANS. Because the current state of ANS technology requires a pan/tilt camera, a standard approach is to incorporate a pan/tilt camera into each MGV.

SUMMARY

In accordance with various embodiments of the present disclosure a plurality of video infrared cameras that give the vehicle crew a view of the horizon in all directions are mounted on the vehicle. Each of the cameras is mounted in a fixed orientation on the vehicle and covers a selected angular range of lateral view, such that in various embodiments every point on the horizon is viewed by two different cameras such that the cameras' fields of view overlap enabling every point on the horizon to be viewed even when a camera is disabled.

Computers and software in the MGV continuously receive data from all of the cameras, store the data in video frame buffers, and stitch the imagery together into a single, seamless panoramic view. In a various embodiments of the disclosure, each crew member of an MGV can select which subset of the view to display on a particular computer console. A display computer maps the selected view to a rectangular region of a video frame buffer, and data from that region is sent to the particular computer console each time a new video frame comes into the buffer. A crew member of the MGV can adjust the selected view to the right or left, up or down, or zoom in or out. The computers and software map pan/tilt commands for individual cameras from the MGV's ANS to regions of the MGV's video frame buffers, and feed appropriately transformed data from the video frame buffers to the ANS. Video data from two different cameras with overlapping fields of view are used to simulate the view of stereo cameras.

Thus, the present disclosure eliminates the need for pan/tilt cameras on MGVs, by using a plurality of fixed cameras, each covering a selected angular range of lateral view with the imagery from the cameras stitched together to produce a single, seamless panoramic view as may be selected by a crew member. With the present disclosure, the MGV does not suffer penalties to its radar and infrared signatures as may occur with the use of pan/tilt cameras and their associated mounts. Moreover, the present disclosure may be used with present ANS technology thereby eliminating the substantial costs that would be associated with developing a new ANS. The present disclosure reduces weight and power requirements as compared to the use of pan/tilt cameras.

Further features and advantages of the present disclosure, as well as the structure and operation of various embodiments of the present disclosure, are described in detail below with reference to the

BRIEF DESCRIPTION OF THE DRAWINGS

FIG. 4 is an illustration of image transformation of the present disclosure in accordance with various embodiments.

DETAILED DESCRIPTION

Figure 1:
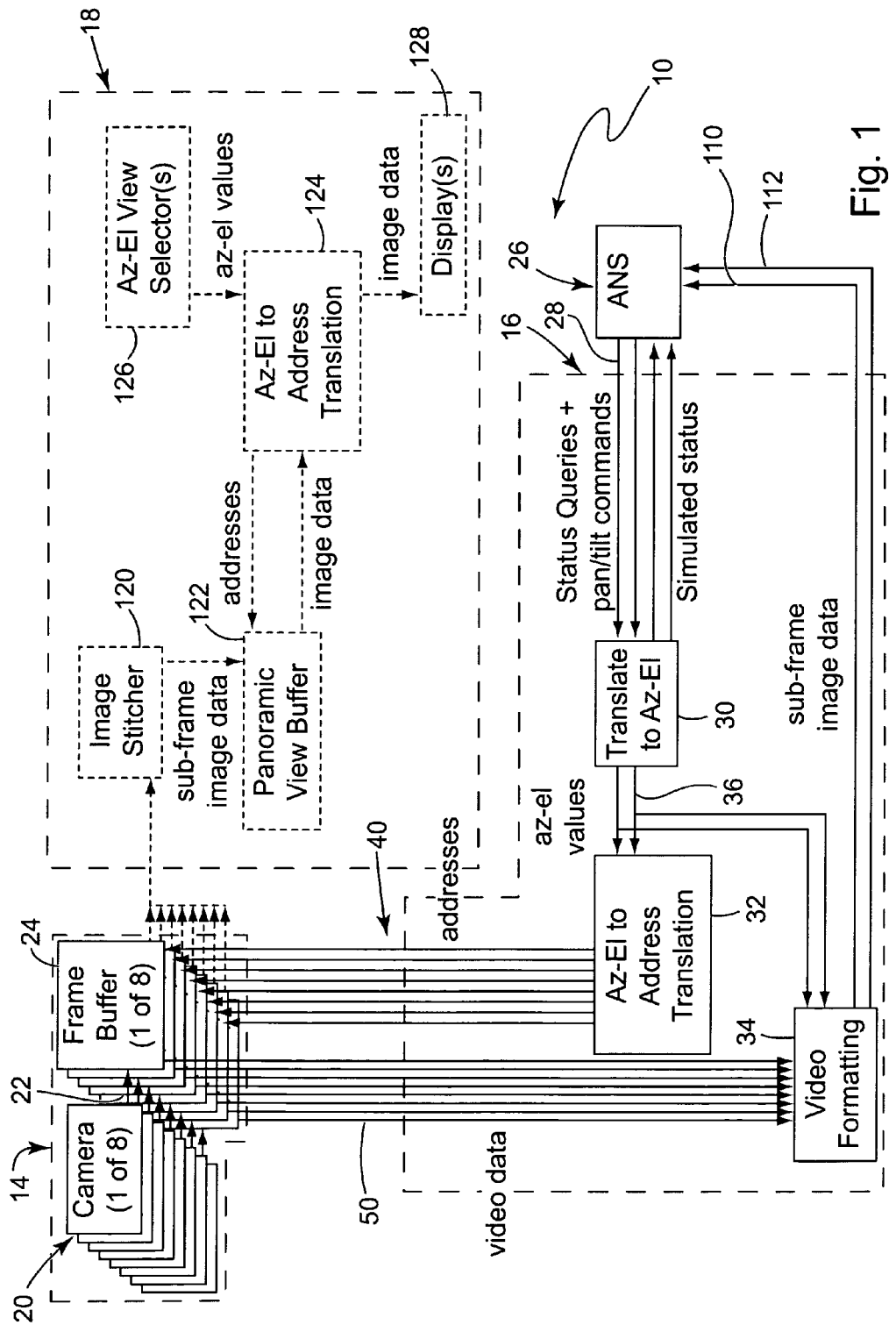
FIG. 1 is a schematic block diagram of the present disclosure in accordance with various embodiments.

With reference to the drawings, there are illustrated various embodiments of a virtual pan/tilt camera system 10 in accordance with the present disclosure for use with a manned ground combat vehicle 12 as illustrated in FIG. 3. The system generally comprises a fixed camera video data input 14, a reformatting network section 16, and a display system section 18. The fixed camera video data input 14 further comprises a plurality of video cameras 20, each of which is mounted in a fixed position on the vehicle 12. In this embodiment eight such cameras are shown, but it is to be understood that a fewer or greater number of cameras may be used. A suitable camera is the Hitachi HV-C20 or the Sony DXC 9000. Each camera outputs video data 22 representing the images viewed by that camera to a frame buffer 24, there being eight such frame buffers, one for each video camera. Each frame buffer stores at addresses within the buffer the video data it receives from its respective camera.

An ANS 26 of the same type used for autonomous navigation of unmanned ground vehicles that use two pan/tilt cameras is programmed to operate as if it were in a system using two pan/tilt cameras. Thus, as previously explained, the ANS is a preexisting system that performs stereo image processing, and includes appropriate hardware and software to autonomously navigate the vehicle as is known in the art. An example of such a system is an ANS incorporated in the experimental unmanned vehicle developed by General Dynamics Robotic Systems and the National Institute of Standards and Technology for the Department of Defense's Demo III program. What the ANS needs in order to perform its required functions is two video input streams from a pair of pan/tilt cameras that it can control. With the system 10 of the present disclosure, there are no pan/tilt cameras. Instead, the system 10 functions to deliver two video input streams generated from fixed cameras, but which have been reformatted to appear to have come from two pan/tilt cameras.

Thus, the ANS determines the best angle at which to point what would be two pan/tilt cameras to get a view of an obstacle, and outputs appropriate pan/tilt commands 28 to the reformatting network system 16. The system 16 comprises a Translate to Az-El component 30, an Az-El to Address Translation component 32, and a Video Formatting component 34. The pan/tilt commands 28 from the ANS 26 are input to the Translate to Az-El component 30 which converts the pan/tilt commands into signals representing the azimuth and elevation for each pan/tilt camera as if such cameras were present in the system. The azimuth and elevation output signals 36 from the Translate to Az-El component 30 are input to the Az-El to Address Translation component 32 which generates address signals 40 which are input to each of the video frame buffers 24. The Az-El to Address Translation component 32 maps the azimuth and elevation signals, as commanded by the ANS, to addresses in the video frame buffers 24, thereby determining which of the frame buffers 24 and which data stored in each buffer to access for generating each section of the image.

Figure 2B:
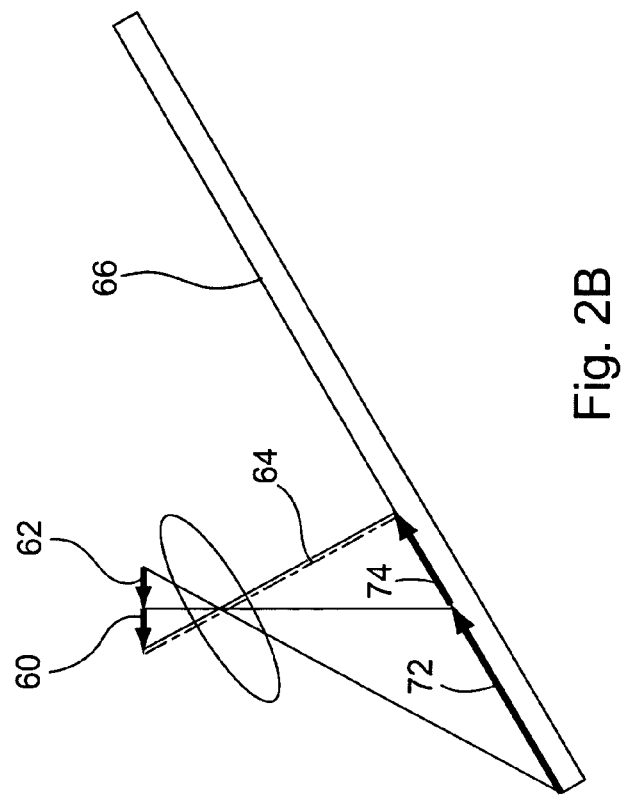
FIG. 2 is a diagram illustrating image distortion.
Figure 2A:
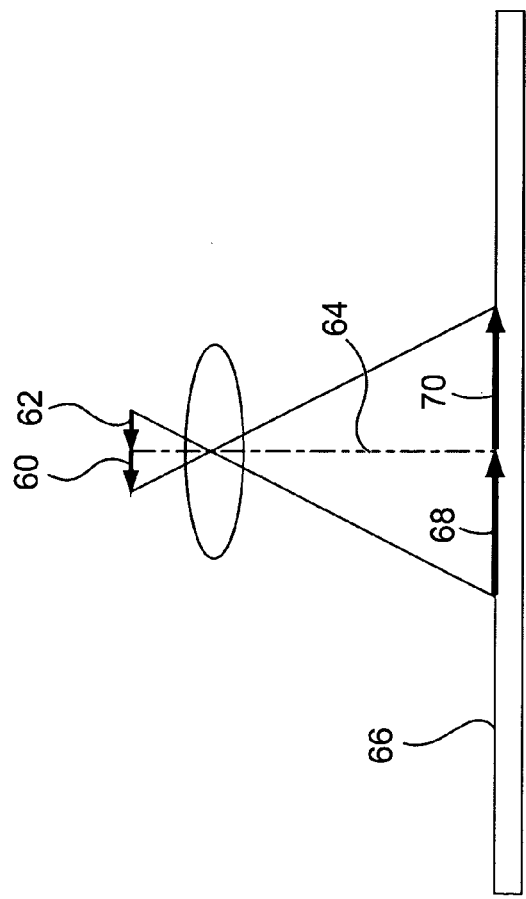

Video data 50 from the specified addresses, as determined by the Az-El to Address Translation component 32, in each of the frame buffers 24 are input to the Video Formatting component 34 which stitches together images from adjacent frame buffers, if needed, and reformats the images to correct the image geometry, made necessary because the fixed cameras 20 do not actually point in the direction specified by the pan/tilt commands 28 from the ANS 26. An image formed to the side of an image plane of a camera 20 is distorted compared to the same image formed at the center of the image plane as illustrated in FIG. 2. FIG. 2A illustrates an image, represented by arrows 60, 62, centered on a camera axis 64, only minimally distorted at the focal plane 66 as shown by the arrows 68, 70 of substantially equal length. FIG. 2B shows the same image, represented by arrows 60, 62, centered off the camera axis 64, distorted at the focal plane 66 as shown by the arrows 72, 74 of unequal length in the image plane.

Figure 3B:
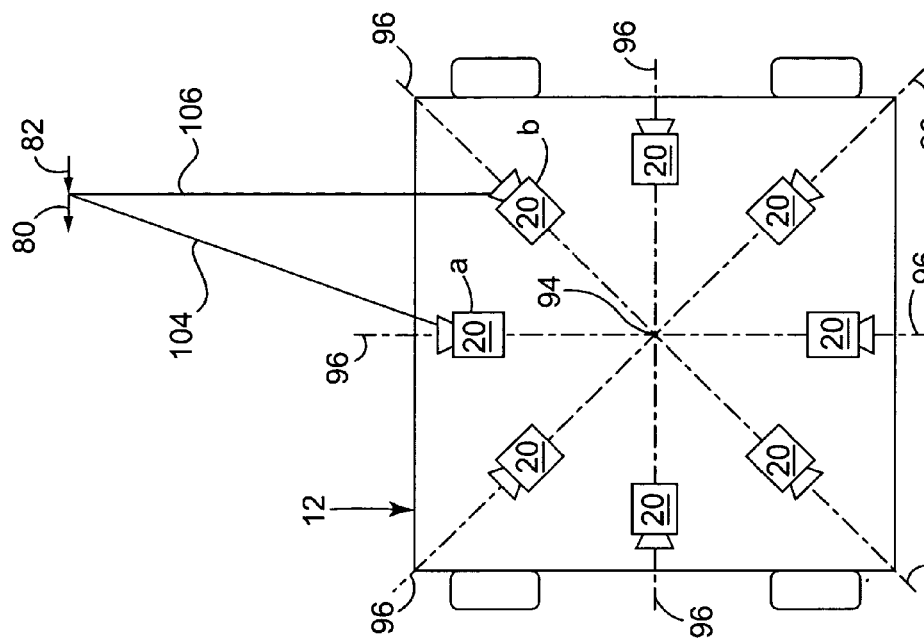
FIG. 3 is a diagram illustrating a geometrical transformation of the present disclosure in accordance with various embodiments.
Figure 3A:
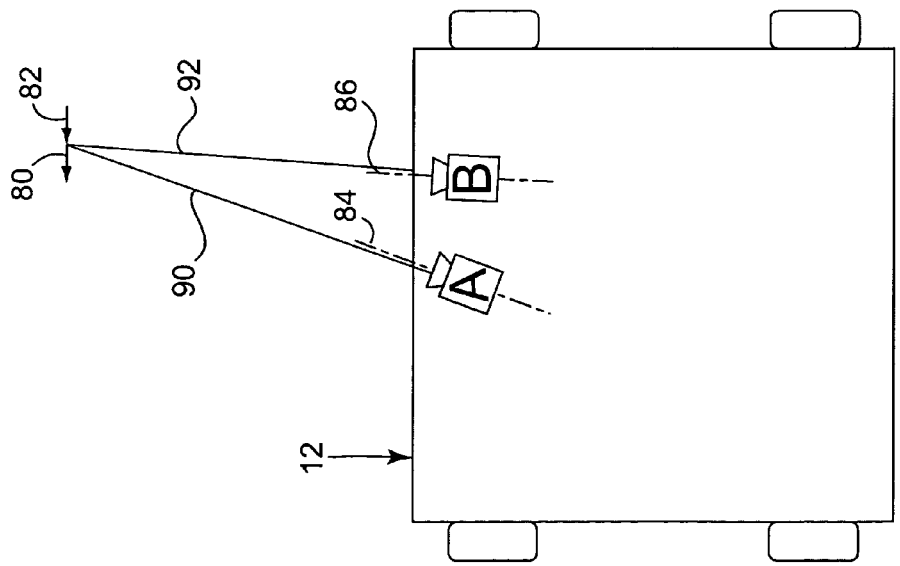

This is further illustrated and explained with reference to FIGS. 3A and 3B. FIG. 3A illustrates a ground combat vehicle 12 having two pan/tilt cameras A and B, each pointing directly, or nearly directly, to an image represented by arrows 80, 82. That is, the camera axes 84, 86 of the cameras A and B are aligned, or nearly aligned, with direct paths, as illustrated by lines 90, 92, between the cameras and the image. FIG. 3B illustrates the same ground combat vehicle 12, but instead of two pan/tilt cameras as in FIG. 3A, the vehicle is equipped with fixed video cameras 20. In such embodiments there are eight such fixed cameras equally circumferentially spaced about a common axis 94 such that collectively they encompass a 360° panoramic view about the vehicle. Thus, the camera axes 96 of the cameras 20 point radially from the central axis 94 and are 45 degrees apart. Each of the cameras covers at least a 90° panoramic view centered about its axis such that adjacent cameras overlap the field of view between them. This way the entire 360° field of view is covered even when one camera is disabled. Thus, two such cameras a and b, viewing the same image as the cameras A and B of FIG. 3A, have their camera axes 96 substantially out of alignment with the direct paths, as shown by lines 104, 106 between the cameras a and b and the image.

For the ANS to perform properly, it must receive two video streams at its inputs 110, 112 that are substantially the same as the video streams it would receive if the image was being viewed by two pan/tilt cameras as in FIG. 3A. However, the video signals generated by the fixed cameras 20 and stored in the video frame buffers do not produce the same video stream as two pan/tilt cameras, because the fixed cameras do not actually point in the direction specified by the pan/tilt commands 28 from the ANS. Therefore, in accordance with the disclosure, the Video Formatting component 34 reformats the images to correct the image geometry.

The functions performed by the Video Formatting component 34 can be implemented as hardware or software. For example, in various embodiments, the Video Formatting component 34 is implemented using a programmable image processing card which may be a purchased off-the-shelf item. As illustrated in FIGS. 3A and 3B, the software on the image processing card transforms the image from a fixed camera's focal plane to the image that would be seen on a pan/tilt camera's focal plane, assuming that the pan/tilt camera was pointed in the direction that the ANS commanded. The camera's focal plane may be a charged coupled device or any device that transforms light images into electrical signals. An image in a video camera is defined by luminous intensity as a function of x and y locations on the CCD, i.e., brightness at each pixel. This may be described as $i=f(x,y)$. To correctly transform the image from a fixed camera to make it appear like an image from a pan/tilt camera, the software performs certain steps. In describing there steps, reference is made: to FIGS. 4a-4g which illustrate an image, shown as a tree figure, on the focal plane of a camera (fixed or virtual).

1) convert pixel indices (rowfixed, columnfixed) for the fixed camera focal plane to physical locations on the fixed camera's focal plane, i.e., (xfixed, yfixed).

2) convert the image from i=f1 (xfixed, yfixed), i.e. intensity as a function of x and y locations on the fixed camera's focal plane, to intensity as a function of Az-El coordinates relative to the fixed camera's optical axis, i.e. i=f2 (Azfixed, Elfixed). This step yields a curved focal plane as shown in FIG. 4c.

3) rotate the Az-El coordinates from step 2 to the appropriate Az-El coordinates relative to the commanded optical axis of the virtual pan/tilt camera, i.e. Azvirtual=g1(Azfixed, Elfixed) and Elvirtual=g2(Azfixed, Elfixed).

4) convert the resulting Az-El image, i=f3(Azvirtual, Elvirtual), to intensity as a function of x and y on the virtual pan/tilt camera's focal plane, i.e., I=f4(xvirtual, yvirtual). The result of this step is a four-sided polygon that is not an exact parallelogram as it has been transformed to a distorted form from the initial parallelogram of FIGS. 4a and 4b.

5) convert the physical locations (xvirtual, yvirtual) to pixel indices, yielding I=f5 (rowvirtual, columnvirtual).

6) Interpolate the pixel values. In general, the center of a pixel in the fixed camera will not map directly to the center of a pixel in the virtual pan/tilt camera, so the (rowvirtual, columnvirtual) values computed in step 5 will be floating point numbers, not integers. Therefore, the Video Formatting component interpolates the intensity values given by I=f5 (rowvirtual, columnvirtual), where the values of (rowvirtual, columnvirtual) do not align with the centers of pixels, to estimate the intensity values at the center of each pixel.

Steps 5 and 6 yield a focal plane shape that is the same as the shape from step 4. Step 5 yields a set of rows and columns that are wider and thicker at the front of the view and the rows and columns line up with the edges of the shape. Step 6 yields a set of rows and columns that have uniform width, such that they do not line up with all edges of the shape.

The algorithms used to solve each of these steps are within the skill of those skilled in the arts of optics and image processing.

The stitched and reformatted video signals from the Video Formatting component 34 are input as two video streams 110, 112 to the ANS 26 which outputs the pan/tilt commands 28 as previously described, which, if pan/tilt cameras were present, would control the direction of the pan/tilt cameras. However, in accordance with the present disclosure, the pan/tilt commands rather than controlling pan/tilt cameras are input to the Translate to Az-El component 30 which converts the pan/tilt commands into the azimuth and elevation that each pan/tilt camera would view if it received those commands. As previously explained, the azimuth and elevation values from the Translate to Az-El component 30 are input to the Az-El to Address Translation component 32 which performs the dual functions of mapping the azimuth and elevation signals to addresses in each frame buffer 24, and determining which frame buffer of the frame buffers 24 to use for each section of the image. The algorithms for performing these functions are known in the art.

The azimuth and elevation values from the translate to Az-El component 30 also are input to the Video Formatting 34 which uses these values to determine the amount of distortion, i.e., the off-axis angle, and which camera to use.

The display system section 18 comprises an Image Stitcher 120, a Panoramic View Buffer 122, an Az-El to Address Translation component 124, an Az-El View Selector(s) 126, and image displays 128. The display system section 18 is known in the art for processing video data to display selected images on displays in manned vehicles for viewing by the crew members. The image stitcher 120 receives video data from the video frame buffers 124, performs various transformations on selected subsets of the video data, and sends the resultant subframe video data to the Panoramic View Buffer 122. The buffer 122 contains image data representing a 360° wide, by approximately 135° high, external view from the vehicle 12. By the Az-El View Selector(s) 126, a crew member selects an azimuth and elevation for viewing, and the Az-El View Selector(s) 126 outputs azimuth/elevation data, in accordance with those selections, to the Az-El to Address Translation component 124, which converts the azimuth/elevation data to a range of memory addresses in the Panoramic View Buffer 122. The image data from the range of memory addresses are output from the Panoramic View Buffer 122 to the displays 128 via the Az-El to Address Translation component 124 to display the selected portion of the panoramic view.

Video from two different cameras with overlapping fields of view is used to simulate the view of stereo cameras. Selecting different ranges of addresses of each of the video frame buffers 24 simulates the effect of panning left or right and tilting up or down as with pan/tilt cameras.

Some ANS systems include a status interface that allows the ANS to check the functionality and position of each pan/tilt camera and mount. For such systems, if the pan/tilt cameras were not present, the ANS would interpret the absence of pan/tilt cameras as a malfunction and would not operate properly. Thus, the present disclosure includes a simulator that simulates the status of the pan/tilt cameras and mounts. The simulator receives status inquiries from the ANS and returns appropriate data. For example, if queried for the current Az-El of the pan/tilt camera, the simulator returns the last commanded Az-El (because that is what a real pan/tilt camera would do if operating properly). If queried for operational status, it returns an "on" if the fixed cameras are turns on, and an "off" if they are turned off.

Thus, the virtual pan/tilt camera system and method of the present, particularly adapted for use with MGVs, can replace the use of pan/tilt cameras, decrease vehicle weight and power needs and reduce risks of detection from radar and infrared sensors that can compromise the low-observable characteristics needed for military vehicles. The present disclosure further provides a system and method that utilizes fixed cameras with known ANS technology.

What is claimed is:

1. A method of automatically navigating a ground vehicle using a plurality of fixed video cameras mounted to the vehicle and using an autonomous navigation system (ANS) programmed to operate with pan/tilt cameras, said method comprising the steps of:

generating video data from said fixed video cameras;
generating commands at the output of said ANS for controlling the positions of pan/tilt cameras;
converting said commands into signals representing azimuths and elevations that said pan/tilt cameras would view;
mapping the azimuth and elevation signals to selected addresses containing the video data;
reformatting the video data from said selected addresses; and
inputting the reformatted video data to the ANS as video streams, said ANS processing said video streams.

2. The method of claim 1 further comprising the steps of:
combining video data from said selected addresses to stitch together images represented by said video data; and inputting the stitched and reformatted data to the ANS as video streams.

3. The method of claim 1 further comprising the step of: displaying images from said video cameras.

4. The method of claim 3 wherein said video cameras view a panoramic image, and each display displays a selected portion of said image.

5. The method of claim 1 wherein said reformatting step further comprises the step of:
transforming the image from each fixed camera to the image that would be seen by a pan/tilt camera pointing in the direction as determined by said commands generated by said ANS.

6. The method of claim 1 further comprising the steps of:
stitching together the video data generated from the video cameras, said stitched together data representing a composite image from said video cameras;
storing said stitched together data; and
providing selected portions of said composite image of the ANS by selectively addressing the stored video data.

7. The method of claim 1 further comprising the steps of:
mounting each of the video cameras on the vehicle such that each camera is mounted in fixed position to point radially outwardly from a common center axis; and
providing a sufficient number of said video cameras such that adjacent ones of the cameras have overlapping fields of view.

8. The method of claim 7 wherein pairs of said cameras have overlapping views such that each portion of said image is viewed by at least two video cameras.

9. The method of claim 8 wherein said cameras are equally circumferentially spaced about said common center axis.

10. The method of claim 9 wherein said providing step further comprises:
providing eight such cameras, each camera having approximately a 90° field of panoramic view.

11. The method of claim 6 further comprising the step of:
selecting portions of the image to be displayed to simulate the effect of a pan/tilt camera that pans in azimuth and elevation.

12. A method of automatically navigating a ground vehicle using a plurality of fixed cameras mounted to the vehicle and using an autonomous navigation system (ANS) programmed to operate with pan/tilt cameras, said method comprising the steps of:
providing a plurality of video cameras on said vehicle, each video camera mounted in a fixed position to view a selected portion of a selected image, said plurality of video cameras collectively viewing a panoramic image encompassing at least 360° about said vehicle, pairs of said cameras having overlapping views such that each portion of said image is viewed by at least two video cameras;
generating video data from said plurality of cameras, the video data from each camera representing the image portion viewed by said camera;
inputting the video data to buffers;
converting signals at the outputs of said ANS, that would be used to control the positions of pan/tilt cameras, to signals representing azimuths and elevations that said pan/tilt cameras would view;
mapping said azimuths and elevations signals to selected addresses in said buffers; and
generating video streams in response to said selected video data for input to said ANS.

13. The method of claim 12 further comprising the steps of:
reformatting said selected video data; and
generating said video streams in response to said reformatted video data.

14. The method of claim 13 further comprising the steps of:
stitching together images as represented by the video data from the selected addresses of said buffers; and
inputting the stitched and reformatted data to the ANS as video streams.

15. A system for automatically navigating a ground vehicle using a plurality of fixed video cameras mounted to the vehicle and using an autonomous navigation system (ANS) programmed to operate with pan/tilt cameras, said system comprising:
a plurality of video cameras for generating video data, each video camera generating video data representing a selected portion of an image;
an ANS for generating commands for controlling the positions of pan/tilt cameras;
a conversion component for converting said commands into signals representing azimuths and elevations that said pan/tilt cameras would view;
a translation component for mapping the azimuth and elevation signals to selected addresses containing said video data generated by said video cameras;
a reformatting component for reformatting the video data from said selected addresses; and inputting the reformatted video data to the ANS as video streams, said ANS processing said video streams.

16. The system of claim 15 wherein said reformatting component stitches together images as represented by said video data from the selected addresses, and inputs the stitched and reformatted data to the ANS as video streams.

17. The system of claim 15 further comprising displays for displaying images from said video cameras.

18. The system of claim 17 wherein said video cameras view a panoramic image, and each display displays a selected portion of said image.

19. The system of claim 15 wherein said reformatting component transforms the image from each fixed camera to the image that would be seen by a pan/tilt camera pointing in the direction as determined by said commands generated by said ANS.

20. The system of claim 15 further comprising:
a stitching component for stitching together the video data generated from the video cameras, said stitched together data representing a composite image from said video cameras; and
a selection component for selecting portions of said composite image for display.

21. The system of claim 15 wherein each of the video cameras is mounted on said vehicle such that each camera is in a fixed position to point radially outwardly from a common center axis, and there being a sufficient number of said video cameras such that adjacent ones of the cameras have overlapping fields of view.

22. The system of claim 21 wherein pairs of said cameras have overlapping views such that each portion of said image is viewed by at least two video cameras.

23. The system of claim 22 wherein said cameras are equally circumferentially spaced about said common center axis.

24. The system of claim 23 wherein there are eight such cameras, each camera having approximately a 90° field of panoramic view.

25. A system for automatically navigating a ground vehicle using a plurality of fixed cameras mounted to the vehicle and using an autonomous navigation system (ANS) programmed to operate with pan/tilt cameras, said system comprising:

a plurality of video cameras on said vehicle, each video camera mounted in a fixed position to view a selected portion of a selected image, said plurality of Video cameras collectively viewing a panoramic image encompassing at least 360° about said vehicle, pairs of said cameras having overlapping views such that each portion of said image is viewed by at least two video cameras, said video cameras generating video data, the video data from each camera representing the image portion viewed by said camera;

buffers for storing the video data generated by the video cameras;

an ANS for generating commands that would control the positions of pan/tilt cameras;

a conversion component for converting said commands generated by said ANS, to signals representing azimuths and elevations that said pan/tilt cameras would view;

a translation component for mapping said azimuths and elevations signals to selected addresses in said buffers to select the video data stored at said selected addresses; and a reformatting component for generating video streams in response to said selected video data for input to said ANS.

26. The system of claim 25 further composing:

a stitching component for stitching together images as represented by the video data from the selected addresses of said buffers, said stitched and reformatted data being input to the ANS as video streams.

27. A vehicle capable of autonomous operation, said vehicle comprising:

a plurality of cameras mounted to said vehicle for generating a panoramic scene;

an autonomous navigation system (ANS) for generating azimuth and elevation commands;

a translator for translating azimuth and elevation commands from said ANS to select sub-sets of the panoramic scene such that the cameras function as a virtual pan/tilt camera system; and a vehicle propulsion system for moving and guiding the vehicle under the direction of said ANS.

28. A method of autonomously navigating a vehicle, said method comprising the steps of:

generating video data from fixed video cameras mounted to said vehicle representing a panoramic image;

selecting video data representing a portion of said panoramic image; and autonomously navigating said vehicle at least partially in response to said selected data.

29. The method of claim 28 further comprising the step of:
providing terrain data representing a map of the terrain in which said vehicle is operating, and wherein said navigating step further comprises navigating said vehicle at least partially in response to said terrain data and said selected data.

30. The method of claim 29 further comprising the step of:
displaying images from said video cameras.

31. The method of claim 30 further comprising the steps of:
stitching together the video data generated from the video cameras, said stitched together data representing a composite image from said video cameras; and
displaying selected portions of said composite image.

32. A method of automatically navigating a vehicle, said method comprising the steps of:

generating a panoramic image using fixed video cameras;
reformatting the panoramic image;
inputting the reformatted panoramic image to an autonomous navigation system designed to operate with pan/tilt cameras, said autonomous navigation system processing the transformed image to navigate the vehicle.

33. A method of automatically navigating a vehicle, said method comprising the steps of:

generating a panoramic image using fixed video cameras;
reformatting the panoramic image;
inputting the reformatted panoramic image to an autonomous navigation system designed to operate with pan/tilt cameras, said autonomous navigation system processing the transformed image to navigate the vehicle, said reformatting step further comprising the steps of:
converting pixel indices for the focal planes of the fixed cameras to physical locations on the cameras' focal planes,
converting the image from intensity as a function of x and y locations on the fixed cameras' focal planes, to intensity as a function of Az-El coordinates relative to the fixed cameras' optical axes,
rotating the Az-El coordinates to Az-El coordinates relative to the commanded optical axes of virtual pan/tilt cameras, thereby producing a resultant Az-El image,
converting the resultant Az-El image to intensity as a function of x and y locations on the virtual pan/tilt cameras' focal planes,
converting the x-y locations to pixel values, and interpolating the pixel values.

34. A method of automatically navigating a vehicle, said method comprising the steps of:

generating a panoramic image using fixed video cameras;
reformatting the panoramic image;
inputting the reformatted panoramic image to an autonomous navigation system designed to operate with pan/tilt cameras, said autonomous navigation system processing the transformed image to navigate the vehicle, said reformatting step further comprising the steps of:
converting pixel indices for the focal planes of the fixed cameras to physical locations on the cameras' focal planes,
converting the image from intensity as a function of x and y locations on the fixed cameras' focal planes, to intensity as a function of Az-El coordinates relative to the fixed cameras' optical axes,
rotating the Az-El coordinates to Az-El coordinates relative to the commanded optical axes of virtual pan/tilt cameras, thereby producing a resultant Az-El image,
converting the resultant Az-El image to intensity as a function of x and y locations on the virtual pan/tilt cameras' focal planes,
converting the x-y locations to pixel values, and interpolating the pixel values.

* * * * *